*(12)* United States Patent
Vaillant et al.

(10) Patent No.: US 8,215,088 B2
(45) Date of Patent: Jul. 10, 2012

(54) METHOD AND MEANS FOR THE HIGH-SPEED MANUFACTURING OF INDIVIDUAL PACKAGING FOR A LIQUID OR SOLID PRODUCT

(75) Inventors: Renaud Vaillant, Gentilly (FR); Pierre Peteuil, Tours (FR)

(73) Assignee: Cryolog S.A., Boulogne Billancourt (FR)

( * ) Notice: Subject to any disclaimer, the term of this patent is extended or adjusted under 35 U.S.C. 154(b) by 415 days.

(21) Appl. No.: 12/442,829

(22) PCT Filed: Apr. 10, 2007

(86) PCT No.: PCT/EP2007/053484
§ 371 (c)(1),
(2), (4) Date: Nov. 20, 2009

(87) PCT Pub. No.: WO2008/037505
PCT Pub. Date: Apr. 3, 2008

(65) Prior Publication Data
US 2010/0065187 A1    Mar. 18, 2010

Related U.S. Application Data

(60) Provisional application No. 60/847,308, filed on Sep. 26, 2006.

(51) Int. Cl.
*B65B 9/02* (2006.01)
*B65B 51/22* (2006.01)
*B29C 65/08* (2006.01)
(52) U.S. Cl. ............ 53/450; 53/553; 53/202; 53/DIG. 2; 156/73.1; 156/580.1

(58) Field of Classification Search ............... 53/450, 53/479, 545, 546, 548, 553, 202, DIG. 2; 156/73.1, 580.1; *B65B 9/02, 9/12, 51/22; B29C 65/08*
See application file for complete search history.

(56) References Cited

U.S. PATENT DOCUMENTS

| 3,222,235 | A |   | 12/1965 | Buchner |        |
|-----------|---|---|---------|---------|--------|
| 3,366,523 | A | * | 1/1968  | Weber   | 53/450 |
| 3,651,615 | A | * | 3/1972  | Bohner et al. | 53/477 |
| 3,874,963 | A |   | 4/1975  | Barger  |        |
| 3,978,637 | A | * | 9/1976  | Mauriello | 53/450 |
| 4,063,101 | A |   | 12/1977 | Duden   |        |

(Continued)

FOREIGN PATENT DOCUMENTS
DE    4126557 A1 *  2/1992
(Continued)

OTHER PUBLICATIONS
International Search Report for PCT/EP2007/053484, mailed Jul. 2, 2007, 2 pages.

*Primary Examiner* — Stephen F Gerrity
(74) *Attorney, Agent, or Firm* — RatnerPrestia

(57) ABSTRACT

A process for manufacturing an individual packaging for a liquid or solid product includes uninterruptedly unwinding a lower film while simultaneously unwinding an upper film with regard to the lower film. The process further includes continuously dispensing, between the two films, the product which is to be packaged and simultaneously forming and sealing the contour of each packaging by ultrasonic welding. This welding is carried out so that the ultrasound ejects the product from the zones being welded.

10 Claims, 2 Drawing Sheets

U.S. PATENT DOCUMENTS

| | | | | |
|---|---|---|---|---|
| 4,630,426 A | * | 12/1986 | Gentry | 53/450 |
| 4,961,302 A | * | 10/1990 | Davis | 53/479 |
| 6,058,680 A | * | 5/2000 | Meli et al. | 53/451 |
| 7,254,929 B1 | * | 8/2007 | Schutz et al. | 53/450 |
| 2004/0040639 A1 | * | 3/2004 | Keen et al. | 156/73.1 |
| 2005/0022476 A1 | * | 2/2005 | Hamer et al. | 53/450 |

FOREIGN PATENT DOCUMENTS

| | | | |
|---|---|---|---|
| JP | 06296452 A | * | 10/1994 |
| JP | 2003267322 A | * | 9/2003 |
| JP | 2004050418 A | * | 2/2004 |
| WO | WO 2006045984 A1 | * | 5/2006 |

* cited by examiner

METHOD AND MEANS FOR THE HIGH-SPEED MANUFACTURING OF INDIVIDUAL PACKAGING FOR A LIQUID OR SOLID PRODUCT

This application claims priority of PCT International Application No. PCT/EP2007/053484 filed on Apr. 10, 2007 which claims priority from U.S. Provisional Application No. 60/847,308 filed Sep. 9, 2006. The contents of these applications are incorporated herein by reference.

FIELD OF THE INVENTION

The present invention concerns a method for the high-speed manufacturing of individual packaging for a liquid or solid product, as well as the means for implementing such method.

BACKGROUND

The purpose of the method in accordance with the invention is the manufacture of individual packets for a product, the product being in any form able to be packed into sachets (liquid, semi-liquid, paste, powder, granular, etc.). Such packaging is currently used in extremely varied fields, such as cosmetics, pharmaceuticals, food-processing, etc.

In order to manufacture such packaging, many methods implementing the hermetic assembly of one or several film or films are known, whereby a dose of the product being packed is imprisoned. For example, a method that implements the following steps is already known: the unwinding of a lower film, the depositing on the latter of individual doses of the product needing to be packed, the placing of a second film on top of the first, then the sealing of the two films around each individual dose and the cutting-out of each dose.

The known methods have the inconvenience of restricting the manufacturing rate embodied due to the implementation mode of one or several of the aforementioned steps. The first factor restricting the embodiment speed is the depositing of the individual doses on the lower film: this step requires the use of means to deposit the product, necessitating very precise dimensions, volume and contour, and which are not compatible with very high speeds. In all events, such a sequential or intermittent dosage is intrinsically not as fast as a continuous dosage.

In other cases, the restricting factor is constituted by the sealing implementation mode. Hence, two possibilities can be distinguished: either the sealing technique imposes stoppage at regular intervals of the film unwinding (notably between each dose) in order to enable sealing under good conditions, or the technique used enables the continuous unwinding of the films, but at a relatively low speed in order to have time to implement adequate sealing.

A method is also known that enables to manufacture individual packets, or unidoses, of tubular shape, commonly called "sticks". This method is currently mainly implemented in the food-processing industry (for example, for individual sachets of sugar, soluble coffee, etc.). The method for manufacturing sticks implements the following steps:

a reel of thermosealing plastic film is unwound, then cut into longitudinal strips by the rotary blades, the width of each strip determining the final width of the sticks;
  once cut into length, the film arrives on a shaping device which joins the edges flesh-to-flesh, then embodies a longitudinal seal;
  each stick thus formed is drawn towards the bottom by the horizontal sealing clamps, which embody a transversal seal;
  the stick is filled up and the top opening is closed by a transversal seal;

The speeds achievable using such a method are limited by the actual nature of said method. Indeed, all machines implementing such a method undergo the constraint of having to operate so-called "vertical and intermittent" filling. Hence, not only the filling (or dosage) and sealing operations are not performed continuously, i.e. via uninterrupted unwinding, but, moreover, such operations can, in no event, be simultaneous. Another inconvenience, the kinematics implemented by this type of machine is both complex and costly, and also contributes to restricting the manufacturing speeds.

SUMMARY OF THE INVENTION

The invention starts out with the observation that in order to significantly increase achievable speeds, the new method must notably enable the high-speed uninterrupted unwinding of the film or films serving to imprison the packed product, such unwinding being combined with continuous dosing (uninterrupted).

Hence, the invention concerns a method for manufacturing individual packets for a liquid or solid product, comprising the following steps:
  the step for unwinding a first film, or lower film, in an uninterrupted manner,
  the step for simultaneously unwinding a second film, or upper film, facing the lower film,
  the step for continuously distributing the product needing to be packed in between the two films,
  the step for simultaneously forming and sealing the contour of each packet by means of ultrasound sealing, such sealing being performed so that the ultrasounds evacuate the product from the zones needing to be sealed.

Hence, due to the invention, it becomes possible to embody the steps for unwinding the films, for depositing the product on one of the films and for hermetically assembling the films in an uninterrupted, continuous manner and at very high speed. Notably, according to the invention, the distribution of the packed product may be embodied in an uninterrupted manner, without it being necessary to form individual pre-separated doses of product, since the action of sealing via ultrasounds is performed in such a manner as to drive the product, during assembly, from the zones needing to be sealed. This operation is embodied via ultrasound with no loss of product, since the product is completely evacuated from the sealing zones towards the packaging zones.

The choice of a sealing technique based on ultrasounds enables to attain the double objective of embodying a seal at very high speed, while maintaining optimal sealing quality. Indeed, the seal is all the more efficient, the more the films are clean, and the action of the ultrasounds enables to completely evacuate the product from the zone needing to be sealed. Hence, the zones concerned by the films are fully exempt of the least trace of product prior to sealing. Finally, compared with other sealing techniques, sealing via ultrasounds enables to inject energy using a high transfer rate. This technique thus offers a high yield, enabling localised and fast sealing, with no destruction of the films.

By implementing the method according to the invention, the unwinding speeds of the films attain approximately 40 meters per minute, which enables to attain manufacturing speeds eight times higher than with the known methods, when using films of identical width. Hence, for equal production, the manufacturing cost price is reduced by as much.

Besides a vast improvement of productivity due to the film's increased unwinding speeds, the invention also provides better quality for the end product: for example, in contrast to known methods, it is possible to pack a product, liquid or not, without the final packaging containing the least amount of residual air. This has a great advantage, notably in pharmaceuticals where the presence of air in packets obliges laboratories to incorporate preserving agents or oxygen traps into the medicine.

Finally, the invention may be implemented using less complex operating kinematics than the known methods, thereby providing even more advantages in relation to the maintenance and cleaning of the manufacturing machines and permitting fast format changes.

In an embodiment, the step for shaping and sealing the packets comprises the step for continuously embodying a longitudinal sealing and the step for embodying, at regular intervals, a transversal sealing of the two films by means of ultrasonic sealing. In an embodiment, the longitudinal sealing of the two films is embodied on at least three tracks, in order for the method to enable several individual packets to be obtained across the width of the films.

In an embodiment, the longitudinal sealing is embodied by ultrasonic sealing.

In an embodiment, the longitudinal sealing is embodied by thermosealing.

In an embodiment, the step for longitudinal sealing is embodied prior to the product distribution step, thereby determining the one or more duct(s) into which the product should be injected.

In an embodiment, injection of the product is performed by means of a plurality of feed nozzles, at least one per duct.

In an embodiment, distribution of the product is embodied according to gravity, under pressure, or by means of a peristaltic pump, the latter enabling to guarantee complete asepsis, insofar as the product is not in contact with the body of the pump, and enabling precise control of the output.

In an embodiment, the lower and upper films are plastic films or barrier materials that may be sealed.

The invention also concerns a manufacturing device for implementing the method defined above.

BRIEF DESCRIPTION OF THE DRAWINGS

An example of the invention's embodiment is described in a non-limitative manner, such as related to the figures hereto, wherein.

DETAILED DESCRIPTION

Figure 1:
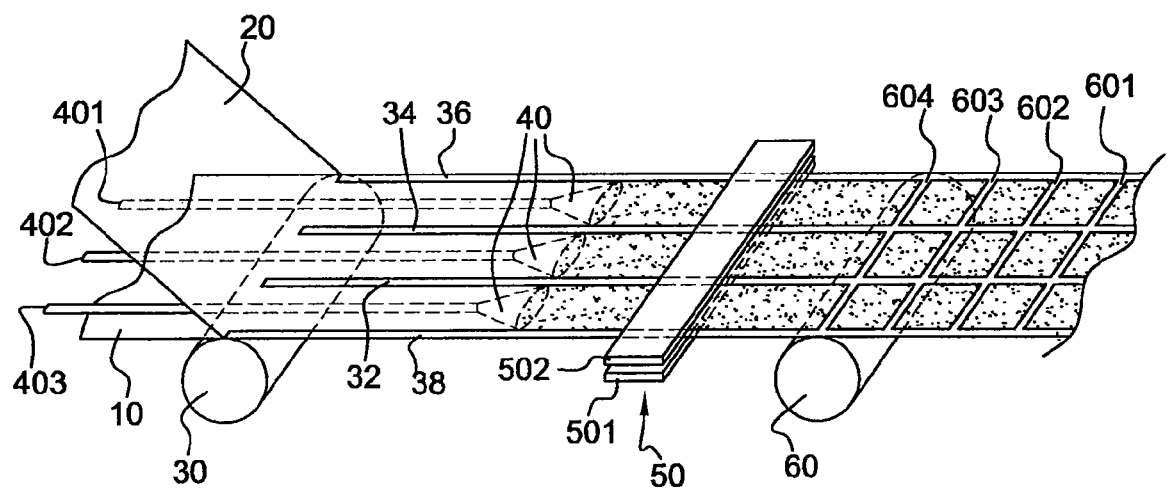
FIG. 1 shows an overall sketch of a device implementing the steps of the invention's method.

FIG. 1 sketches the various steps of the manufacturing method according to the invention, A first film 10, called "lower film", is unwound at high speed, e.g. 40 meters per minute, in a continuous, uninterrupted manner. A second film 20, or "upper film", is unwound facing the first film 10, at the same speed. The second film 20 is then placed on top of the first film 10, after which a first ultrasonic sealing cylinder 30 is set in motion. This cylinder 30 is dedicated to embodying the longitudinal leakproof ultrasonic seals of the two films, i.e. the seals set in a direction almost parallel to the unwinding direction of the films. The cylinder 30 also enables to embody several intermediary longitudinal seals 32, 34, 36, 38. These intermediary seals delimit several cavities or ducts that are to be filled by the product to be packed. The number of cavities made determines the number of final packets finally obtained across the width, called "reel width", of the films 10, 20, i.e. in a direction almost perpendicular to their unwinding direction.

In an embodiment variant, the longitudinal seals may be embodied by means of any other technique, for example, by thermosealing, since no product quantity is required on the surfaces of the two films during this step. It is also possible to choose seals of varying quality depending on their direction, for example a weak longitudinal seal combined with strong transversal seals. Such configuration is, for example, useful when wishing to obtain a unique packet containing two pre-separated components, which, when subsequently used, are intended to be brought into contact with each other. Their coming into contact is thus embodied by making the so-called "weak" seal give way, the packet itself fully retaining its leakproof capacity due to the so-called "strong" seals.

Injection of the liquid or viscous product needing to be packed simultaneously into each duct is then embodied by means of feed nozzles 40, or of dies. These nozzles are filled via the pipes 401, 402, 403 from reservoirs, either according to gravity, under pressure using inert gas, or even by means of volumetric pumps, notably by means of peristaltic pumps. In such a case, it will be possible to employ a single-use flexible plastic pouch as a reservoir, thereby guaranteeing complete asepsis.

Injection of the product is continuous and uninterrupted: the output is never nil. If each nozzle is equipped with its own supply reservoir, it is thus possible to pack simultaneously using a same film for various products, since the injection is made directly into the ducts, separated in a leakproof manner. Should this not be the case, it is of course possible to use a reservoir common to all feed nozzles.

In a variant, each nozzle is equipped with a flattened tip, its width nearing that of the corresponding duct, the product thus being efficiently spread across the width of each duct.

Injection of the product is achieved via force-filling in order to drive out any air present in the ducts and so that each duct is adequately filled. Preferably, once the injection done, the product comes under slight over-pressure between the internal walls of the films 10, 20, thereby enabling guarantee of optimal filling. After injection of the product, a level-filling surveillance device enables to regulate the filling of each nozzle.

In a variant, the feed nozzles may be equipped with a means, such as an O-ring, thereby ensuring that each corresponding duct is respectively leakproof, thus enabling injection under pressure of the liquid or viscous product. In such a case, a gap will be provided on each nozzle in order to evacuate the air contained inside the corresponding duct. In addition, an air suction system could be possible in order to improve the efficiency of the filling process.

The system used for injecting the product enables to guarantee a better asepsis in relation to the known methods, as well as more simplified maintenance and cleaning. Indeed, injection by means of nozzles avoids having to use mechanical elements, such as pumps and electromagnetic valves. In a variant, an even better response is given to these problems through the use of disposable elements for the reservoirs, the feed nozzles and any other element destined to contain or to transport the product needing to be packed.

A compression device 50 comes into action downstream from the surveillance device, thereby enabling to regulate the thickness and the pressure of the product contained between the two films. This device thus serves to finely regulate the thickness and the final weight of each individual packet obtained, and notably to achieve perfect reproducibility of these parameters. In the example, device 50 comprises two pressure plates 501, 502, that clamp the two films 10, 20 together. The gap and the angle formed by these two plates are adjustable and enable to influence the thickness and pressure parameters of the product contained between the two films 10, 20. This device 50 also enables to level out the transversal distribution of the product inside each duct. In a variant, the device 50 is embodied by means of a cylinder torque, possibly revolving, placed opposite each other on either side of the two films 10 and 20.

Figure 2:
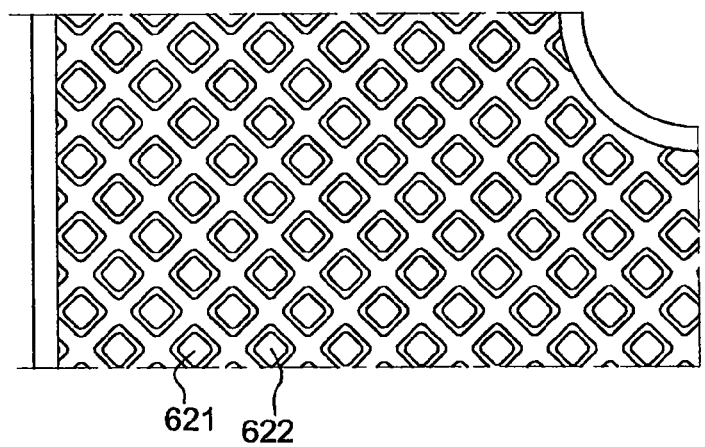
FIG. 2 shows a portion of the surface of an ultrasonic sealing cylinder that can be implemented by the method according to the invention.

A second ultrasonic sealing cylinder 60 is placed downstream from the device 50, thereby embodying transversal seals 601, 602, 603, 604 at regular intervals. The ultrasonic sealing technique enables to drive the product out of the zones needing to be sealed. The assembly obtained is thus perfectly hermetic. Upon conclusion of this last step, the individual packets of products are delimited and hermetically closed, although still being attached to each other. The interval between the two transversal seals determines, along with the width of the ducts, the final dimensions of each packet. FIG. 2 shows a portion of the cylinder 60 surface corresponding to a sealing zone. The zones for sealing on the cylinder surface show a distribution of troughs 621, 622, etc. The density of the meshing and the shape of these troughs determine, along with the time of contact, the final quality of the embodied seal.

Figure 3:
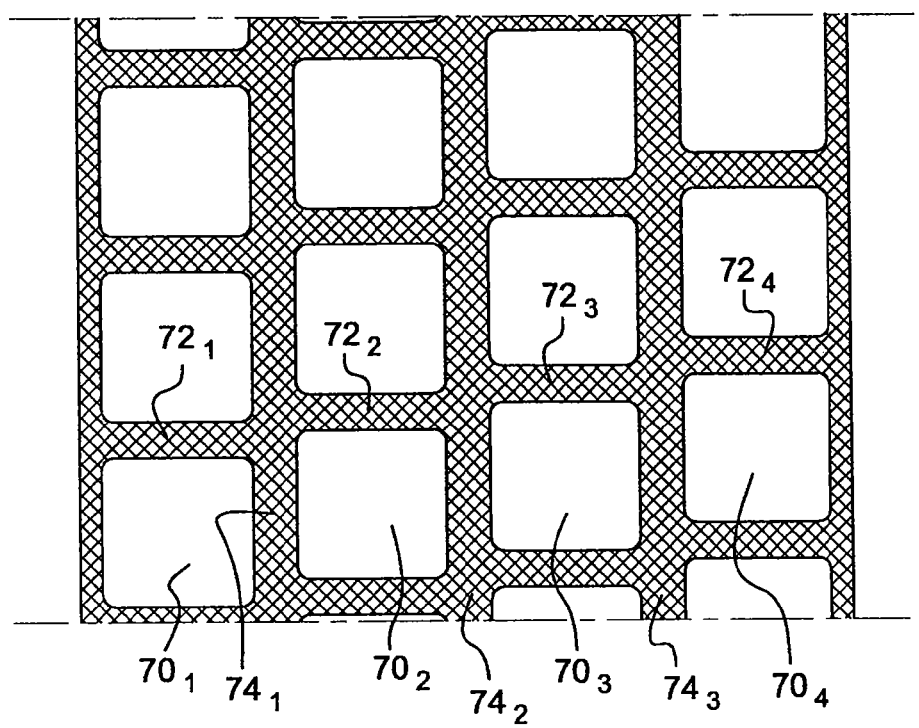
FIG. 3 shows an intermediary product obtained using the device in FIG. 1.
Figure 4:
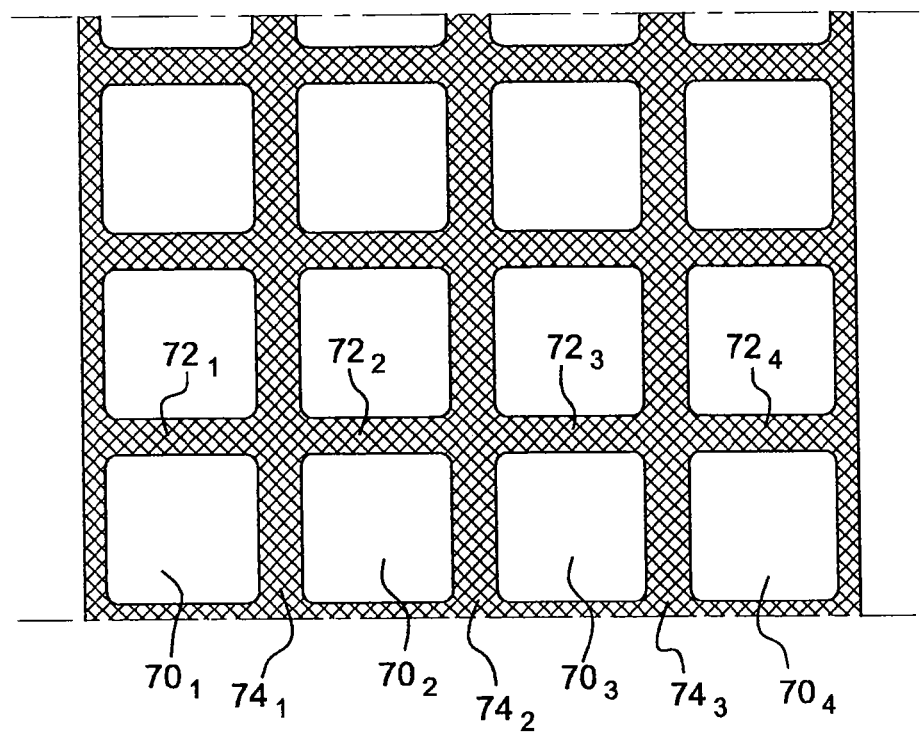
FIG. 4 shows an intermediary product obtained using a different sealing method than that in FIG. 3.

FIGS. 3 and 4 each show an intermediary product of the method of the invention, achieved according to a different ultrasonic sealing implementation mode.

FIG. 3 shows the various packets 70$_1$, 70$_2$, etc. already formed and sealed, prior to cutting out. In this example, the longitudinal 74$_1$, 74$_2$, etc. and transversal 72$_1$, 72$_2$, etc. seals have been embodied simultaneously, via a unique sealing cylinder. In order to optimise the transversal time of contact, the transversal seals 72$_1$, 72$_2$, etc. are slightly offset and are thus consecutively embodied by the sealing cylinder.

FIG. 4 shows the same schema, but in the case of two different sealing cylinders being used, one for embodying the transversal seals, the other for embodying the longitudinal seals. In this example, the packets can be aligned in the transversal direction, since the energy required for embodying all the seals is distributed along the two cylinders.

In an embodiment variant, it is possible to use a guiding device (not illustrated) that enables prior separation of the gel in areas needing to be sealed, such device coming into action before the cylinder 60. Such a device will be especially useful when the thickness of the product is significant.

The packets then undergo a shaping step, such step comprising at least one of the following operations:
cutting out according to a predetermined shape of each packet,
preliminary cutting out according to a predetermined shape of each packet,
cutting out of a predetermined number of packets,
preliminary cutting out of a predetermined number of packets, In an embodiment variant of the invention, the surface of the ultrasonic sealing cylinders 30, 60 may be covered by an embossed pattern, such as represented in FIG. 2. Such a pattern is embodied by drilling a plurality of regularly spaced holes on the outer surface of the cylinder. Hence, during the sealing of the films, this pattern is printed as embossing on the sealed zones, giving them a rough look. Such roughness enables to reinforce the leakproof capacity and resistance of the seals made.

In another embodiment variant, a third ultrasonic sealing cylinder is used downstream from the second cylinder 60. This third cylinder 70 enables to create additional seals on the individual packets already closed. For example, the internal pressure of the packet can be increased by reducing its dimensions (and thus its internal volume) using new longitudinal and/or transversal seals. It is also possible to choose to create a seal whose design represents a particular embossed pattern enabling to obtain a packet showing an embossed pattern due to alternating between the sealed zones (hence, flat) and the zones not sealed (thick since containing product).

The method according to the invention is applicable to all types of films, notably plastic films and aluminium-coated films. The films used can be transparent or printed, totally or partially. In a variant, one or several printing modules can be integrated onto a machine implementing the method according to the invention, such modules coming into action preferably before the films have been gathered together.

The use of self-adhesive barrier material as the lower film constitutes an interesting application of the invention, thereby enabling the manufacture of individual packets in the form of sticky labels, intended, for example, to be used as preservation indicators.

The device according to the invention may be designed in order to operate horizontally, such as shown in FIG. 1, or vertically, with the films thus unwinding from top to bottom, or in an oblique manner. This last position notably enables to facilitate the filling of the ducts due to the natural upward air flow.

Products, obtained by way of the method and of the device in accordance with the invention, cover a very broad scope. The films used, their width notably comprised between 50 millimeters and one meter, enable to is obtain doses of product comprised between 1 milliliter and one liter. The final dimensions of each packet range from 10 millimeters to over 300 millimeters.

The invention may be applied to many areas requiring the production of dosages, or a group of individual dosages, whether of a liquid and/or viscous product conditioned in powder form. Commonly noted, for example, are samples of cosmetic products, perfume, hygiene products or medicine, as well as the freshness or conservation indicators of products, notably foodstuffs, etc.

The invention claimed is:

1. A method for manufacturing packaging containing individual doses of a product in liquid, viscous or powder form, comprising the following steps:
    unwinding a first, lower film in an uninterrupted manner,
    simultaneously unwinding a second, upper film facing the lower film,
    continuously distributing the product to be packed in between the two films, without forming individual doses of product, separated in advance,
    simultaneously shaping and sealing a contour of each packaging packet, so that it is hermetically closed, by means of ultrasonic sealing, such sealing being performed so that the ultrasounds evacuate the product from the zones to be sealed towards packaging zones.

2. A method according to claim 1, wherein the shaping and sealing the packaging packet comprises performing, at regular intervals, a transversal sealing of the two films by said means of ultrasonic sealing, and continuously performing a longitudinal sealing.

3. A method according to claim 2, in which the longitudinal sealing of the upper and lower films is performed on at least three tracks, in order for the method to enable the obtaining of several individual packaging packets across a width of the films.

4. A method according to claim 3, in which the distributing is performed by injecting the material using at least one duct and the longitudinal sealing is performed prior to the distributing.

5. A method according to claim 4, wherein injection of the product is performed by means of a plurality of feed nozzles, at least one per duct.

6. A method according to claim 2, in which the longitudinal sealing is performed via ultrasonic sealing.

7. A method according to claim 2, in which the longitudinal sealing is performed via thermosealing.

8. A method according to claim 1, wherein the distribution of the product is performed either according to gravity or under pressure.

9. A method according to claim 1, wherein the lower and upper films are plastic films.

10. A device for manufacturing packaging containing individual doses of a product in liquid, viscous or powder form, comprising:
- means for unwinding a first, lower film in an uninterrupted manner,
- means for simultaneously unwinding a second, upper film facing the lower film
- means for continuously distributing the product to be packed in between the two films, without forming individual doses of product, separated in advance,
- ultrasonic sealing means for simultaneously shaping and sealing a contour of each packaging packet, so that it is hermetically closed such sealing being performed so that the ultrasounds evacuate the product from the zones to be sealed towards packaging zones.

* * * * *